United States Patent
Becerra et al.

(10) Patent No.: US 10,236,805 B2
(45) Date of Patent: *Mar. 19, 2019

(54) METHODS AND SYSTEMS FOR CONTROLLING AN ELECTRIC MOTOR

(71) Applicant: Regal Beloit America, Inc., Beloit, WI (US)

(72) Inventors: Roger Carlos Becerra, Fort Wayne, IN (US); Ludovic Andre Chretien, Columbia City, IN (US); Glen C. Young, Fort Wayne, IN (US); David Allen Clendenen, Fort Wayne, IN (US); Yao Da, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/623,272

(22) Filed: Feb. 16, 2015

(65) Prior Publication Data

US 2015/0162859 A1   Jun. 11, 2015

Related U.S. Application Data

(63) Continuation of application No. 13/749,242, filed on Jan. 24, 2013, now Pat. No. 8,981,686.

(51) Int. Cl.
*H02P 21/06* (2016.01)
*H02P 6/10* (2006.01)
*H02P 21/24* (2016.01)

(52) U.S. Cl.
CPC ............ *H02P 6/10* (2013.01); *H02P 21/24* (2016.02)

(58) Field of Classification Search
CPC ..................... H02P 21/0035; H02P 21/146
(Continued)

(56) References Cited

U.S. PATENT DOCUMENTS

| 4,761,600 A | 8/1988 | D'Atre et al. |
| 5,786,992 A * | 7/1998 | Vinciarelli ............ H02J 1/102 363/131 |

(Continued)

FOREIGN PATENT DOCUMENTS

| CA | 2206409 A1 | 11/1998 |
| EP | 1429450 B1 | 2/2008 |

(Continued)

OTHER PUBLICATIONS

ISR/WO for PCT/US14/12858 dated May 14, 2014; 17 pages.
(Continued)

*Primary Examiner* — Rina Duda
(74) *Attorney, Agent, or Firm* — Armstrong Teasdale LLP

(57) ABSTRACT

Methods and systems for controlling an electric motor are provided. An electric motor controller is configured to be coupled to an electric motor. The controller includes a rectifier, an inverter coupled to the rectifier, and a control unit coupled to the inverter. The rectifier is configured to rectify an alternating current (AC) input voltage to produce a pulsed direct current (DC) voltage that drops to approximately zero during each cycle when the AC input voltage transits zero. Energy is stored on a load coupled to the motor when AC input voltage is available. The inverter is configured to receive the DC voltage and to provide a conditioned output voltage to the motor. The control unit is configured to manage energy transfer between the motor and the load such that the motor generates positive torque when the DC voltage supplied to the inverter has approximately 100% voltage ripple.

17 Claims, 10 Drawing Sheets

(58) Field of Classification Search
USPC ............... 318/400.02, 800, 801, 803
See application file for complete search history.

(56) References Cited

U.S. PATENT DOCUMENTS

| | | | |
|---|---|---|---|
| 5,818,194 | A | 10/1998 | Nordby |
| 6,215,261 | B1 | 4/2001 | Becerra |
| 6,741,060 | B2 | 5/2004 | Krefta et al. |
| 6,768,284 | B2 | 7/2004 | Lee et al. |
| 6,828,746 | B2 | 12/2004 | Kumar |
| 6,839,249 | B2 * | 1/2005 | Kalman ............ H02M 7/4826 363/35 |
| 7,095,208 | B2 | 8/2006 | Kawaji et al. |
| 7,332,885 | B2 * | 2/2008 | Schnetzka ............ H02J 9/062 318/400.01 |
| 7,557,543 | B2 | 7/2009 | Prakash et al. |
| 7,650,760 | B2 | 1/2010 | Nataka et al. |
| 7,670,253 | B2 | 3/2010 | Sah |
| 7,739,016 | B2 | 6/2010 | Morris |
| 7,865,287 | B2 | 1/2011 | Huseman |
| 7,908,064 | B2 | 3/2011 | Cawthorne et al. |
| 7,977,896 | B2 | 7/2011 | Heap et al. |
| 7,987,934 | B2 | 8/2011 | Huseman |
| 7,990,092 | B2 | 8/2011 | Woodward |
| 8,010,263 | B2 | 8/2011 | Morris |
| 8,018,193 | B1 | 9/2011 | Pekarek et al. |
| 8,049,459 | B2 | 11/2011 | Woodward |
| 8,050,821 | B2 | 11/2011 | Morris et al. |
| 8,140,230 | B2 | 3/2012 | Haggerty et al. |
| 8,195,352 | B2 | 6/2012 | Morris |
| 8,212,506 | B2 * | 7/2012 | Iwahori ............... B60L 11/08 318/139 |
| 8,232,760 | B2 * | 7/2012 | Lu ............... H02P 23/0077 318/798 |
| 2007/0080669 | A1 | 4/2007 | Poore et al. |
| 2010/0315025 | A1 | 12/2010 | Yundt et al. |
| 2010/0315027 | A1 | 12/2010 | Wystrup et al. |
| 2012/0147633 | A1 | 6/2012 | Jones |
| 2012/0303189 | A1 | 11/2012 | Namuduri et al. |

FOREIGN PATENT DOCUMENTS

| | | |
|---|---|---|
| EP | 2040373 A1 | 3/2009 |
| EP | 1521358 B1 | 6/2011 |
| EP | 1465333 B1 | 10/2012 |
| EP | 1843463 B1 | 7/2013 |
| JP | H05137378 A | 6/1993 |
| JP | 20060304386 A | 11/2006 |
| JP | 20090195049 A | 8/2009 |
| JP | 4416486 B2 | 2/2012 |
| KR | 101006589 B1 | 1/2011 |
| WO | 20120127851 A2 | 9/2012 |

OTHER PUBLICATIONS

Patent Examination Report No. 1, AU 20132054591 dated Aug. 15, 2014, 3 pages.
Saren, H et al, "DTC Driven Single Phase Fed Voltage Source Inverter with Small DC-Link Capacitor", Industrial Electronics, 2005. ISIE 2005. Proceedings of the IEEE International Symposium on Dubrovnik, Croatia, Piscataway, NJ., USA, IEEE, vol. 2, Jun. 20, 2005, pp. 411-416, XP010850114.
Extended European Search Report, dated Aug. 31, 2016; Application No. 14753884.7-1806.2949036, PCT/US2014012858, 6 Pages.

* cited by examiner

METHODS AND SYSTEMS FOR CONTROLLING AN ELECTRIC MOTOR

CROSS-REFERENCE TO RELATED APPLICATIONS

The present application is a continuation application of U.S. application Ser. No. 13/749,242, filed Jan. 24, 2013, the entire disclosure of which is hereby expressly incorporated herein by reference.

BACKGROUND OF THE DISCLOSURE

The field of the invention relates generally to electric motors, and more specifically, to methods and systems for operating electric motors.

Typical electric motor systems include a motor controller and an electric motor. The motor controller receives power from an alternating current (AC) power supply, and applies it to a rectifier and to filter capacitors to generate a smoothed direct current (DC) voltage. The motor controller then supplies the DC voltage to the electric motor, which uses the power to drive a load.

Filter capacitors typically used in motor controllers include electrolytic capacitors with high capacitances (about 1000 μF). The high capacitances cause the capacitors of the motor controller to be bulky and expensive. These filter capacitors necessitate a larger motor controller and may reduce the lifespan of the motor controller.

BRIEF DESCRIPTION OF THE DISCLOSURE

In one aspect, an electric motor controller configured to be coupled to an electric motor is provided. The controller includes a rectifier, an inverter coupled to the rectifier, and a control unit coupled to the inverter. The rectifier is configured to rectify an alternating current (AC) input voltage to produce a pulsed direct current (DC) voltage that drops to approximately zero during each cycle when the AC input voltage transits zero. Energy is stored on a load coupled to the motor when AC input voltage is available. The inverter is configured to receive the DC voltage and to provide a conditioned output voltage to the motor. The control unit IS configured to manage energy transfer between the motor and the load such that the motor generates positive torque when the DC voltage supplied to the inverter has approximately 100% voltage ripple In another aspect, a method is provided of controlling an electric motor using a motor controller. The electric motor is configured to be coupled to a power supply and to a load. The method includes rectifying an alternating current (AC) input voltage received from the power supply to produce a pulsed direct current (DC) voltage, wherein the DC voltage drops to a value of approximately zero during each half cycle when the AC input voltage transits a value of zero, wherein energy is stored on the load coupled to the electric motor when AC input voltage is available. The method also includes receiving, by an inverter coupled to an output of the rectifier, the DC voltage to provide a conditioned output voltage to the electric motor. The method further includes controlling, by a control unit coupled to the inverter, energy transfer between the electric motor and the load such that the electric motor generates positive torque when the DC voltage supplied to the inverter is one of approaching zero and equal to zero.

In yet another aspect, a system is provided that includes a motor controller coupled to an electric motor. The motor controller includes a rectifier, an inverter coupled to an output of the rectifier, and a control unit coupled to the inverter. The rectifier is configured to rectify an alternating current (AC) input voltage to produce a pulsed direct current (DC) voltage that drops to a value of approximately zero during each cycle when the AC input voltage transits a value of zero. Energy is stored on a load coupled to the electric motor when AC input voltage is available. The inverter is configured to receive the DC voltage and to provide a conditioned output voltage to the electric motor. The control unit is configured to manage energy transfer between the electric motor and the load such that the electric motor generates positive torque when the DC voltage supplied to the inverter is one of approaching zero and equal to zero.

DETAILED DESCRIPTION OF THE DISCLOSURE

Figure 1:
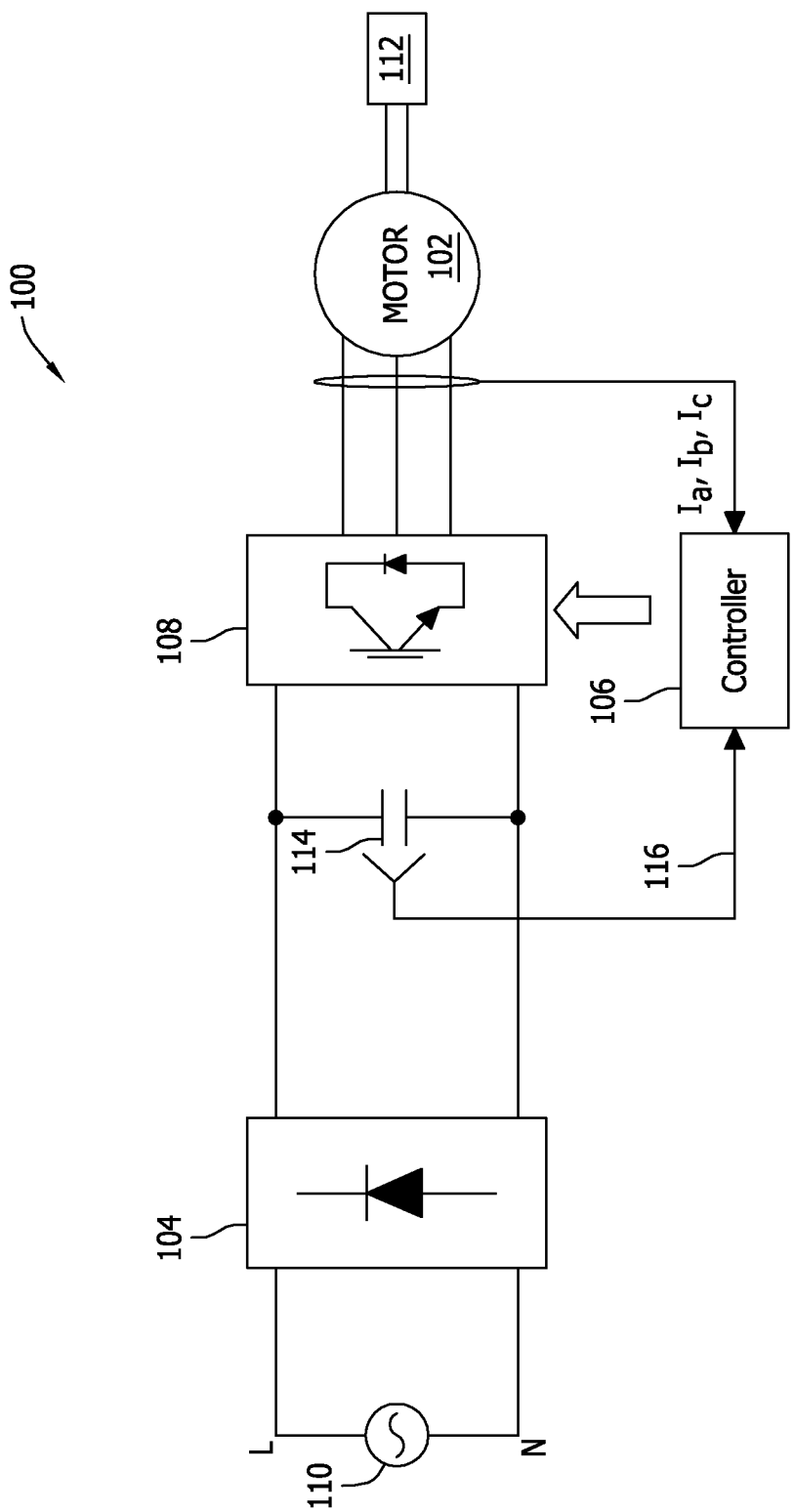
FIG. 1 is a functional diagram of a motor controller that may be used for operating an electric motor.

FIG. 1 is a functional diagram of a motor controller 100 that may be used for operating an electric motor 102. In the exemplary embodiment, motor controller 100 includes a rectifier 104, a controller 106, and an inverter 108. Motor controller 100 is coupled to a power supply 110 for receiving input power to drive electric motor 102. Electric motor 102 is coupled to and drives a load 112.

In the exemplary embodiment, power supply 110 supplies a single-phase alternating current (AC) voltage to motor controller 100. However, power supply 110 may supply three-phase AC, direct current (DC) voltage, or any other type of input voltage that enables motor controller 100 to function as described herein. Rectifier 104 receives an AC input voltage from a power supply 110 and rectifies it to produce a pulsed DC voltage. Inverter 108 conditions the pulsed DC voltage, and supplies it to electric motor 102, which uses the power to drive load 112. In the exemplary embodiment, inverter 108 converts the pulsed DC voltage to a three-phase AC voltage. Alternatively, inverter 108 converts the pulsed DC voltage to any type of voltage that enables motor controller to function as described herein.

In some embodiments, motor controller 100 includes a low-capacitance capacitor 114 for storing small amounts of energy when input voltage is available. Capacitor 114 may have a capacitance between about 0.1 µF/kW and about 10 µF/kW. The use of bulky, unreliable electrolytic filter capacitors in motor controller 100 is avoided. In some embodiments, capacitor 114 is configured to filter out switching frequency harmonics of electric motor 102. In other embodiments, the low-capacitance of capacitor 114 reduces inrush input current to electric motor 102. Further, capacitor 114 facilitates motor controller 100 increasing line input power factor.

Motor controller 100 also includes a voltage sensor 116 coupled across capacitor 114. Voltage sensor 116 is configured to measure a DC link voltage being output by rectifier 104. Voltage sensor 116 provides the DC link voltage measurement to controller 106 for use in controlling electric motor 102 to produce torque when DC link voltage has a 100% voltage ripple.

Figure 2:
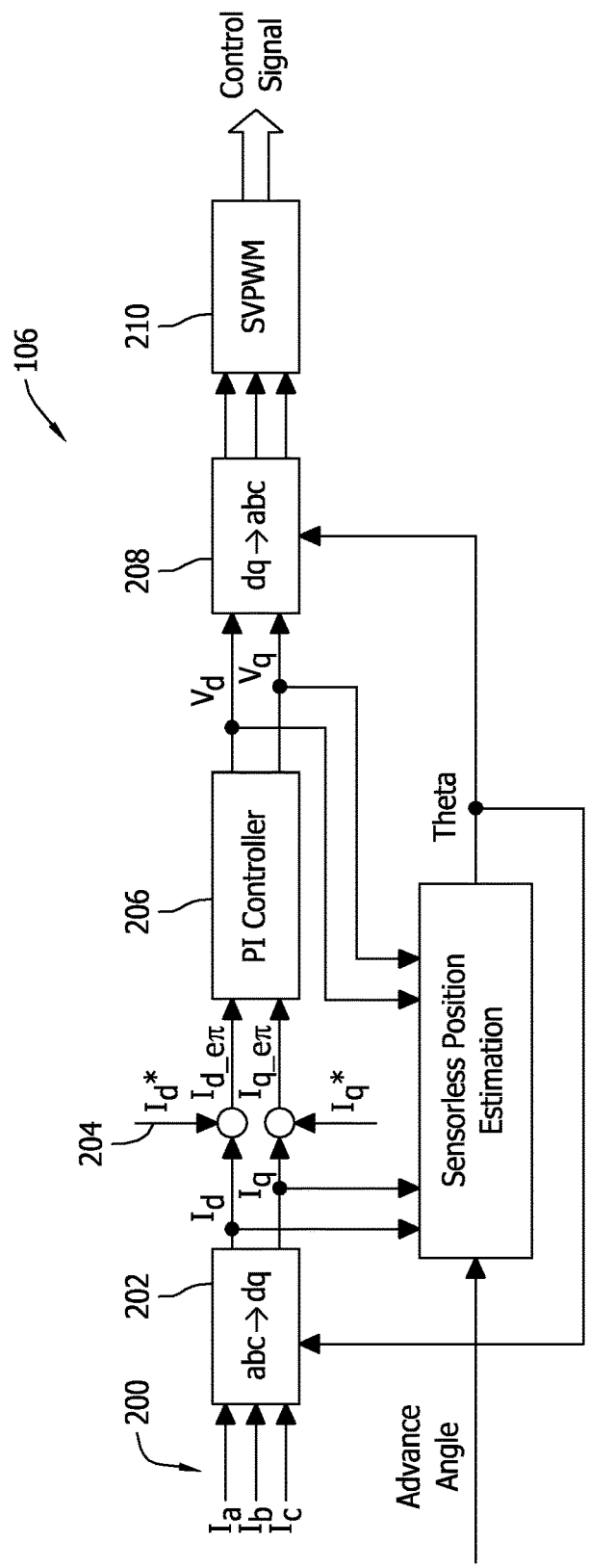
FIG. 2 is a block diagram of an exemplary controller that may be used with the motor controller shown in FIG. 1.

FIG. 2 is a block diagram of an exemplary algorithm implemented by controller 106 (shown in FIG. 1). Because there is no filter capacitor in motor controller 100 (shown in FIG. 1), DC link voltage drops to zero each time the AC input voltage drops to zero. Typically, when DC link voltage drops to zero, also referred to as a 100% voltage ripple, regeneration and braking occur in electric motor 102, which may cause undesired effects in electric motor 102. In the exemplary embodiment, controller 106 is configured to control electric motor 102 (shown in FIG. 1) to produce torque when input voltage is one of approaching zero and equal to zero. More specifically, in the exemplary embodiment, controller 106 is configured to control electric motor 102 to produce torque when DC link voltage has a 100% voltage ripple.

In the exemplary embodiment, controller 106 is coupled to rectifier 104 and to inverter 108 (both shown in FIG. 1). Controller 106 receives three-phase motor current measurements $I_a$, $I_b$, and $I_c$ from at least one current sensor 200, which is coupled to electric motor 102. Controller 106 includes a d-q conversion module 202, a current command generator 204, a PI controller 206, an a-b-c conversion module 208, and a modulator 210.

Current measurements $I_a$, $I_b$, and $I_c$ are converted to a d-q reference frame by d-q conversion module 202 to obtain a d-axis current $I_d$, related to a flux linkage component of the current and a q-axis current $I_q$ related to a torque component of the current. $I_d$ and $I_q$ are sent to PI controller 206. Current command generator 204 generates a d-axis command $I_d^*$ and a q-axis command $I_q^*$, which are both also sent to PI controller 206.

PI controller 206 prepares voltage values $V_d$ and $V_q$ to be applied to electric motor 102 such that the d-axis current value $I_d$ and the q-axis current value $I_q$ become equal to the d-axis current command $I_d^*$ and the q-axis current command $I_q^*$. $V_d$ and $V_q$ are converted back to a three-phase coordinate system by a-b-c conversion module 208, which provides the three-phase voltage values $V_a$, $V_b$, and $V_c$ to modulator 210. Modulator 210 outputs the voltage values $V_a$, $V_b$, and $V_c$ to inverter 108 as a pulse-width-modulated (PWM) signal. Modulator 116 outputs the PWM signal with a frequency, angle, and/or duty cycle to provide suitable power to electric motor 102.

In the exemplary embodiment, controller 106 is configured to control electric motor 102 to produce torque when input voltage is one of approaching zero and equal to zero. In controlling electric motor 102, controller 106 is configured to maintain torque of electric motor 102 above a predetermined level when input voltage is zero. More specifically, in the exemplary embodiment, controller 106 is configured to control current flowing to electric motor 102 such that electric motor 102 produces torque when input voltage is one of approaching zero and equal to zero.

In one embodiment, to control current flowing to electric motor 102, controller 106 is configured to induce the flux linkage component $I_d$ of the current to maintain the torque component $I_q$ of the current above zero while reducing loss of energy stored in the stator windings of electric motor 102. In another embodiment, to control current flowing to electric motor 102, controller 106 is configured to induce the flux linkage component $I_d$ of the current to maintain the torque component $I_q$ of the current above zero while reducing torque ripple in electric motor 102. In yet another embodiment, to control current flowing to electric motor 102, controller 106 is configured to induce the flux linkage component $I_d$ of the current to maintain the torque component $I_q$ of the current above zero while manipulating torque harmonics to reduce audible noise in electric motor 102.

In the exemplary embodiment, controller 106 is implemented in one or more processing devices, such as a microcontroller, a microprocessor, a programmable gate array, a reduced instruction set circuit (RISC), an application specific integrated circuit (ASIC), etc. Accordingly, in this exemplary embodiment, d-q conversion module 202, current command generator 204, PI controller 206, a-b-c conversion module 208, and modulator 210 are constructed of software and/or firmware embedded in one or more processing devices. In this manner, controller 106 is programmable, such that instructions, intervals, thresholds, and/or ranges, etc. may be programmed for a particular electric motor 102 and/or operator of electric motor 102. One or more of d-q conversion module 202, current command generator 204, PI controller 206, a-b-c conversion module 208, and modulator 210 may be wholly or partially provided by discrete components, external to one or more processing devices.

Figure 3:
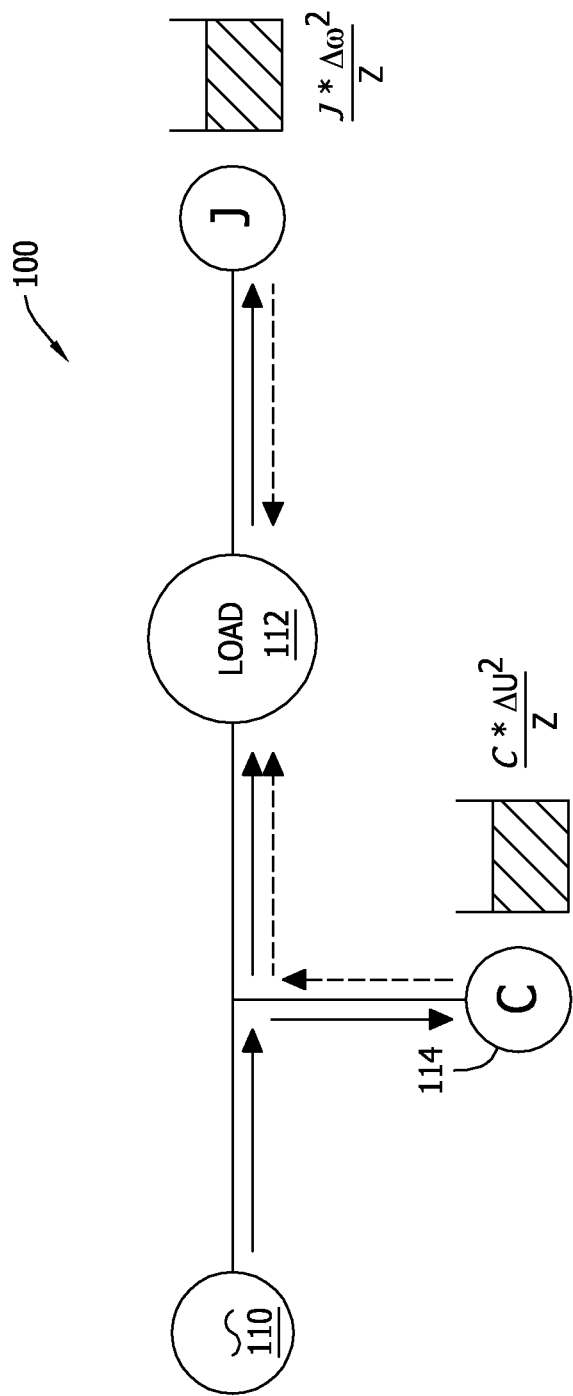
FIG. 3 is an operational diagram of the exemplary motor controller shown in FIG. 1, in which energy may be stored on a load coupled to an electric motor.
Figure 4:
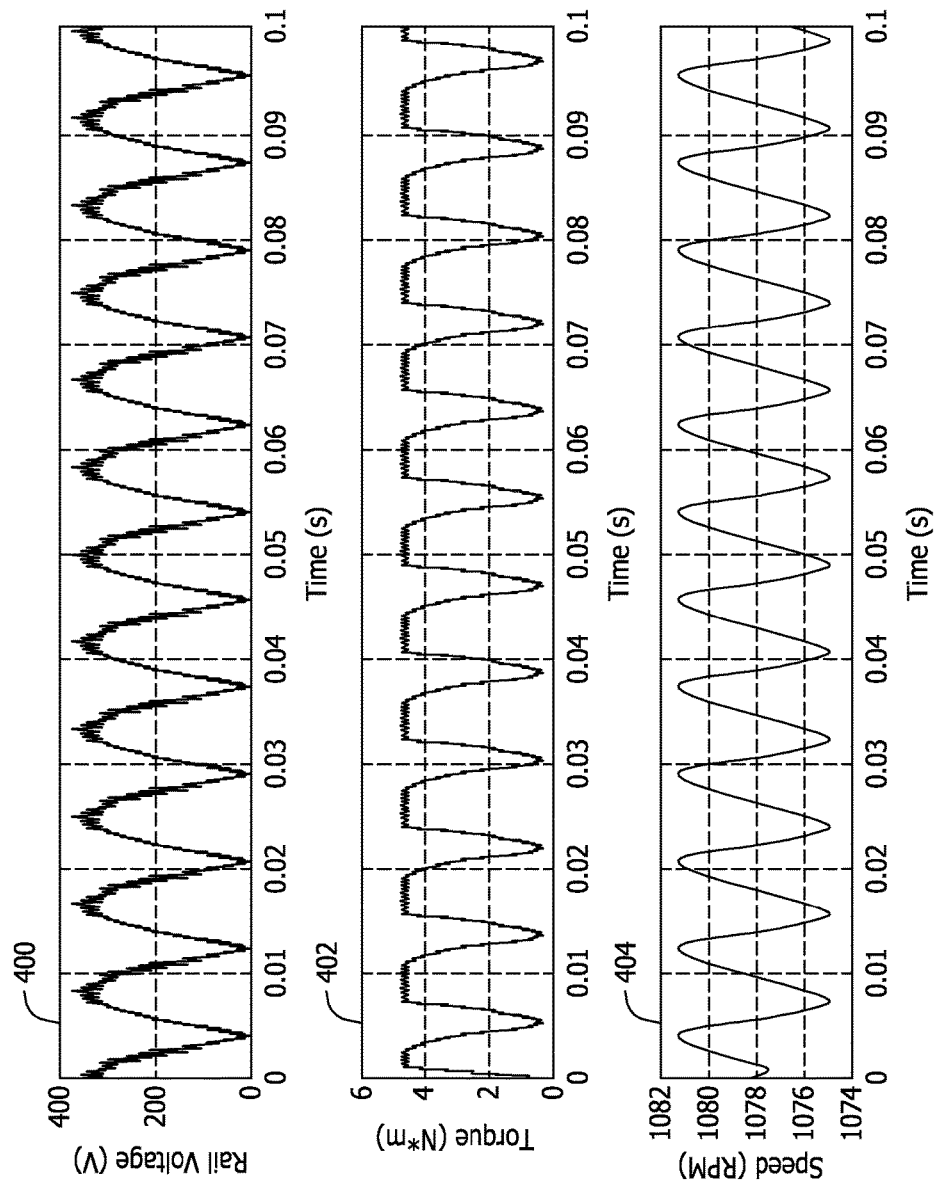
FIG. 4 illustrates a graphical relationship between rail voltage, torque, and rotational speed the exemplary electric motor controller shown in FIG. 1.

FIG. 3 is an operational diagram of motor controller 100 in which inertial energy may be stored on electric motor 102. FIG. 4 illustrates a graphical relationship between rail voltage 400, torque 402 produced by rotation of electric motor 102, and rotational speed 404 of load 112. Motor controller 100 is substantially similar to motor controller 100 (shown in FIG. 1), and as such, components shown in FIGS. 3 and 4 are labeled with the same reference numbers used in FIG. 1.

An increase in input voltage to motor controller 100 results in an increase in armature current. The increase in armature current results in an increase in torque production by electric motor 102, resulting in increased acceleration. As rotational speed of electric motor 102 increases, induced voltage on electric motor 102 also increases. As a result, current and torque gradually decrease until torque again equals the load or induced voltage equals the applied voltage. A decrease in voltage results in a decrease of armature current and a decrease in torque produced by electric motor 102, causing electric motor 102 to slow down. Induced voltage may momentarily be higher than the applied voltage, causing regenerative braking in electric motor 102.

Because only a small capacitor 114 is used in motor controller 100, large amounts of voltage are not be stored on the DC link of motor controller 100. Rather, in the exemplary embodiment, motor controller 100 stores energy on rotational load 112, which is coupled to a rotatable shaft (not shown) of electric motor 102. More specifically, in the exemplary embodiment, load 112 is a mechanical energy storage device. For example, in one embodiment, load 112 may be a blower and/or fan used in an air moving control system.

During operation, in the exemplary embodiment, rectifier 104 rectifies the AC line input voltage received from power supply 110 into a pulsed AC. When AC line input voltage is available (i.e., increasing in graph 400), controller 106 is configured to store energy in rotating load 112 at inertia. More specifically, when input voltage is available, the torque increases (graph 402), causing the rotational speed (graph 404) of load 112 to also increase, as is shown in FIG. 4. Inertia stored on rotating load 112 is represented by the equation $$\frac{J*\Delta\omega^2}{2},$$

where J represents inertia of load 112 and $\Delta\omega$ represents a change in speed of load 112 with respect to time. In the exemplary embodiment, the inertia of load 112 limits speed variations of electric motor 102, which enables torque production to continue when input voltage is unavailable.

In one embodiment, while input voltage is available, processing unit also stores small amounts of voltage in capacitor 114. When the AC line input voltage approaches zero, controller 106 controls capacitor 114 to provide the stored voltage to electric motor 102. The amount of energy stored in capacitor 114 is represented by the equation $$\frac{C*\Delta U^2}{2},$$

where C represents a capacitance of capacitor 114 and $\Delta U$ represents a change in voltage in capacitor 114 with respect to time.

As the input voltage begins to drop, torque produced on load 112 by electric motor 102 turns into rotational speed. As AC line input voltage approaches zero, controller 106 manages energy transfer from load 112 to electric motor 102 (represented by dashed arrows). More specifically, controller 106 controls current flowing to electric motor 102 such that electric motor 102 continues producing torque when input voltage to electric motor 102 approaches zero or equals zero. To do so, controller 106 implements an algorithm (shown in FIG. 2) to produce a signal that induces a flux linkage component of current to maintain a torque component of the current above zero. More specifically, controller 106 injects a negative d-axis current signal to electric motor 102 as AC line input voltage approaches zero to maintain q-axis current at a positive level. In an alternative embodiment, controller 106 also manages energy transfer from capacitor 114 to electric motor 102 (represented by dashed arrows). These energy transfers enable electric motor 102 to operate while input voltage is low or unavailable during each phase of the pulsed DC.

Figure 5:
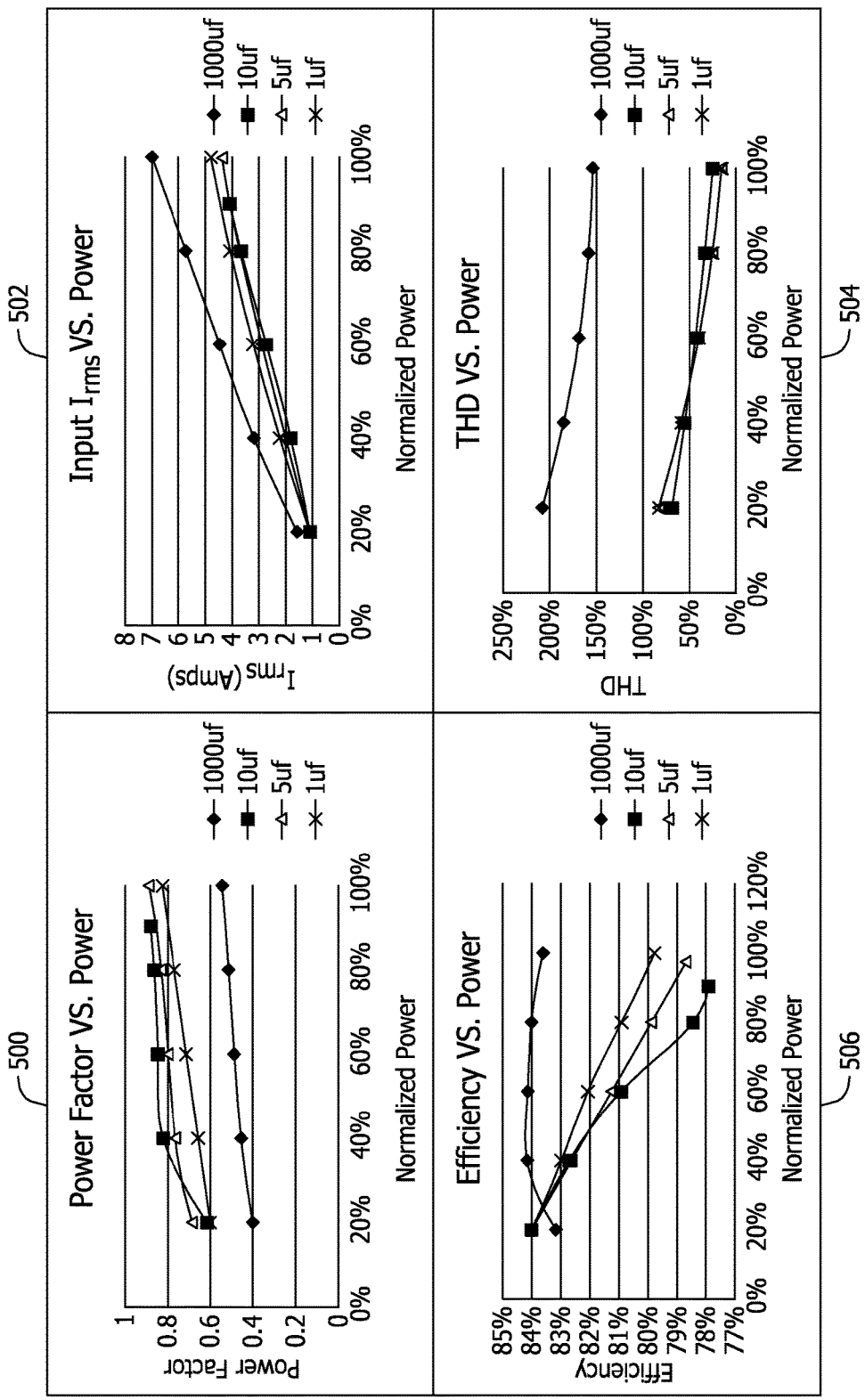
FIG. 5 illustrates multiple performance benefits achieved by using the exemplary motor controller shown in FIG. 1.

FIG. 5 illustrates multiple performance benefits achieved by using motor controller 100 (shown in FIG. 1) as opposed to using known motor controllers (not shown) using large electrolytic capacitors. Performance of known motor controller using 1000 µF electrolytic filter capacitors is represented by the line containing diamonds. Performance of motor controller 100 using a 10 µF capacitor 114 (shown in FIG. 1) is represented by the line containing squares; using a 5 µF capacitor 114 is represented by the line containing triangles; and using a 1 µF capacitor 114 is represented by the line containing "X's".

Graph 500 compares power factor of electric motor 102 (shown in FIG. 1) to different power levels of electric motor 102. The power factor of electric motor 102 using motor controller 100 is noticeably higher than the power factor of an electric motor using known electrolytic capacitor motor controllers, regardless of which capacitance of capacitor 114 is used.

Graph 502 compares input current to operating power of electric motor 102. Input current is inversely related to the power factor shown in graph 500. Graph 502 shows that electric motor 102 with motor controller 100 operates at the same power level, while using less input current than known motor controllers.

Graph 504 compares total harmonic distortion (THD) to electric motor 102 operating power. In the exemplary embodiment, THD using motor controller 100 is reduced by approximately 50% over THD using known motor controllers.

Graph 506 compares efficiency of electric motor 102 to operating power. Motor controller 100 does not filter the rectified AC line input voltage, so current levels in motor controller 100 are large compared to known motor controllers. Accordingly, up to about 6% efficiency may be sacrificed using motor controller 100. However, this decrease in efficiency is acceptable in some applications when compared to the increased power factor, reduced THD, and reduced size of motor controller 100.

Figure 6:
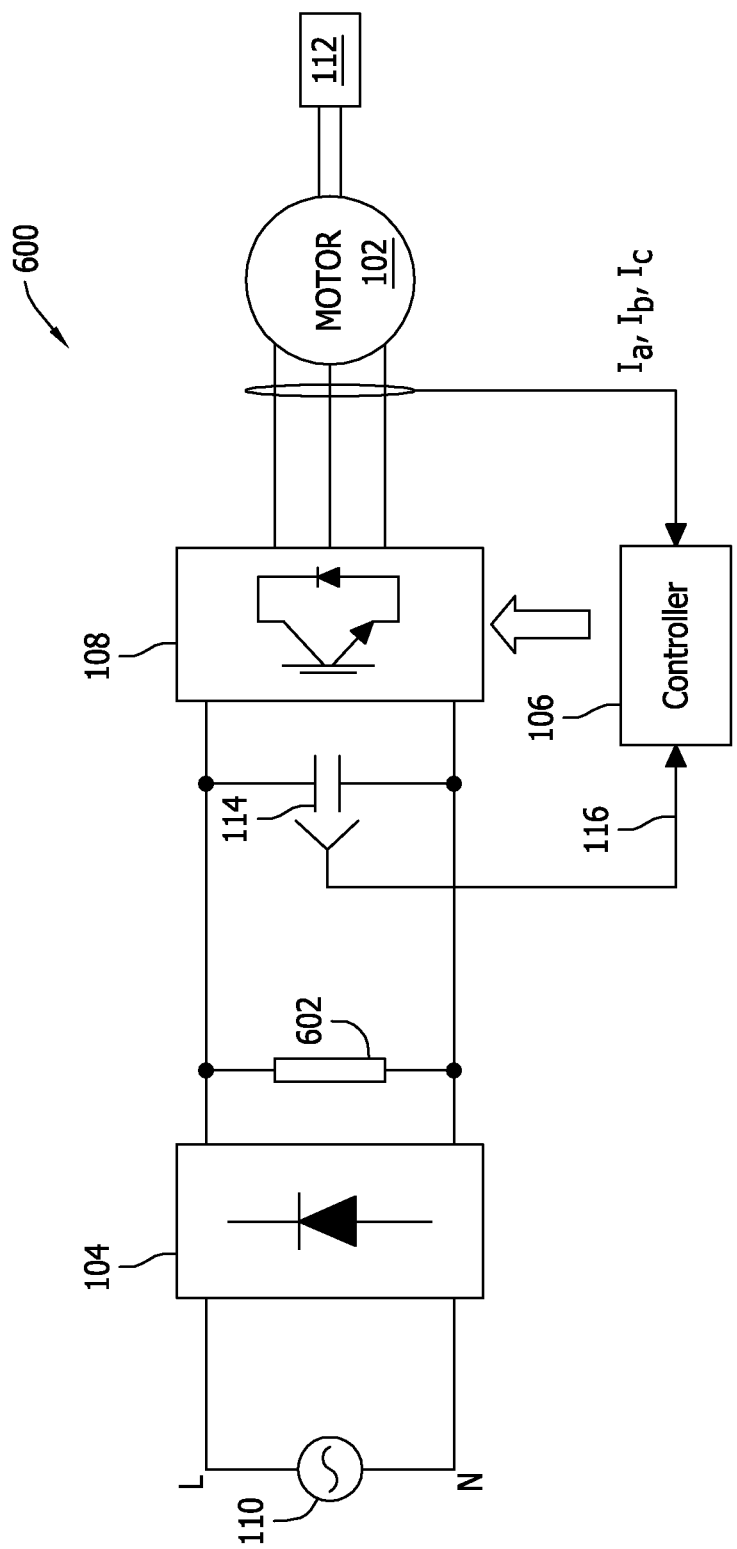
FIG. 6 is a functional diagram of an exemplary embodiment of a motor controller.

FIG. 6 is a functional diagram of an exemplary embodiment of a motor controller 600. Components of motor controller 600 that are identical to components of motor controller 100 (shown in FIG. 1) are described using the same reference characters as in FIG. 1.

In the exemplary embodiment, motor controller 600 includes rectifier 104, controller 106, and inverter 108. Motor controller 600 is coupled to power supply 110 for receiving input power to drive electric motor 102. Electric motor 102 is coupled to and drives a load 112. Controller 106 implements the algorithm described in FIG. 2.

In the exemplary embodiment, power supply 110 supplies a single-phase alternating current (AC) voltage to motor controller 600. However, power supply 110 may supply three-phase AC, DC voltage, or any other type of input voltage that enables motor controller 600 to function as described herein. Rectifier 104 receives an AC input voltage from power supply 110 and rectifies it to produce a pulsed DC voltage. Inverter 108 conditions the pulsed DC voltage, and supplies it to electric motor 102, which uses the power to drive load 112. In the exemplary embodiment, inverter 108 converts the pulsed DC voltage to a three-phase AC voltage. Alternatively, inverter 108 converts the pulsed DC voltage to any type of voltage that enables motor controller to function as described herein.

In the exemplary embodiment, motor controller 600 includes capacitor 114 for storing small amounts of energy when input voltage is available. Capacitor 114 has a capacitance between about 0.1 µF/kW and about 10 µF/kW. The use of bulky, unreliable electrolytic filter capacitors in motor controller 600 is avoided. In some embodiments, capacitor 114 is configured to filter out switching frequency harmonics of electric motor 102. In other embodiments, the low-capacitance of capacitor 114 reduces inrush input current to electric motor 102. Further, capacitor 114 facilitates motor controller 600 increasing line input power factor. Voltage sensor 116 (shown in FIG. 1) may also be provided across capacitor 114 for measuring DC link voltage being output by rectifier 104. Voltage sensor 116 provides the DC link voltage measurement to controller 106 for use in controlling electric motor 102 to produce torque when DC link voltage has a 100% voltage ripple.

In the exemplary embodiment, motor controller 600 also includes a voltage clamping device 602 coupled across a DC link of motor controller 600. Voltage delivered to inverter 108 may be very large due to the low-capacitance of capacitor 114, which may cause the rating of inverter 108 to be exceeded. Voltage clamping device 602 is configured to protect motor controller 600 from over-voltage conditions. In the exemplary embodiment, voltage clamping device 602 is a metal oxide varistor (MOV). In alternative embodiments, voltage clamping device 602 may be any device capable of providing over-voltage protection.

Figure 7:
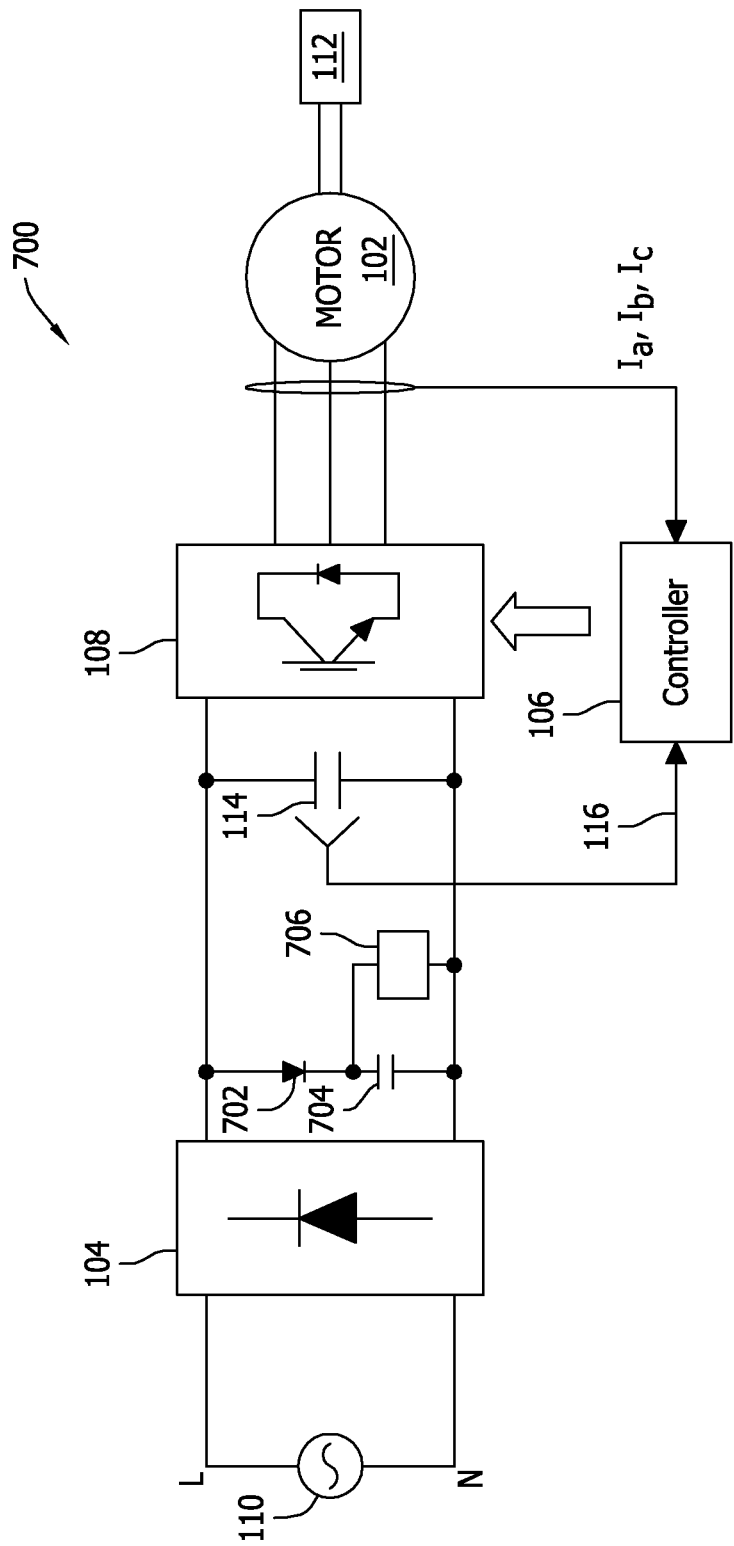
FIG. 7 is a functional diagram of an exemplary embodiment of a motor controller.

FIG. 7 is a functional diagram of an exemplary embodiment of a motor controller 700. Components of motor controller 700 that are identical to components of motor controller 100 (shown in FIG. 1) are described using the same reference characters as in FIG. 1.

In the exemplary embodiment, motor controller 700 includes rectifier 104, controller 106, and inverter 108. Motor controller 700 is coupled to power supply 110 for receiving input power to drive electric motor 102. Electric motor 102 is coupled to and drives a load 112. Controller 106 implements the algorithm described in FIG. 2.

In the exemplary embodiment, power supply 110 supplies a single-phase AC voltage to motor controller 700. However, power supply 110 may supply three-phase AC, DC voltage, or any other type of input voltage that enables motor controller 700 to function as described herein. Rectifier 104 receives an AC input voltage from power supply 110 and rectifies it to produce a pulsed DC voltage. Inverter 108 conditions the pulsed DC voltage, and supplies it to electric motor 102, which uses the power to drive load 112. In the exemplary embodiment, inverter 108 converts the pulsed DC voltage to a three-phase AC voltage. Alternatively, inverter 108 converts the pulsed DC voltage to any type of voltage that enables motor controller to function as described herein.

In the exemplary embodiment, motor controller 700 includes capacitor 114 for storing small amounts of energy when input voltage is available. Capacitor 114 has a capacitance between about 0.1 μF/kW and about 10 μF/kW. The use of bulky, unreliable electrolytic filter capacitors in motor controller 700 is avoided. In some embodiments, capacitor 114 is configured to mitigate switching frequency harmonics of electric motor 102. In other embodiments, the low-capacitance of capacitor 114 reduces inrush input current to electric motor 102. Further, capacitor 114 facilitates motor controller 700 increasing line input power factor. Voltage sensor 116 (shown in FIG. 1) may also be provided across capacitor 114 for measuring DC link voltage being output by rectifier 104. Voltage sensor 116 provides the DC link voltage measurement to controller 106 for use in controlling electric motor 102 to produce torque when DC link voltage has a 100% voltage ripple.

In the exemplary embodiment, motor controller 700 also includes a diode 702 coupled in series with a capacitor 704. Diode 702 and capacitor 704 are coupled to the DC side of rectifier 104. Diode 702 isolates input line voltage as it drops to zero. Together, diode 702 and capacitor 704 provide a constant voltage to be delivered to a low-voltage power supply 706. In the exemplary embodiment, low-voltage power supply 706 provides power for electronics of motor controller 700, such as, for example, controller 106. Additionally, capacitor 704 makes power supply 706 independent of main DC voltage variations in motor controller 700.

Figure 8:
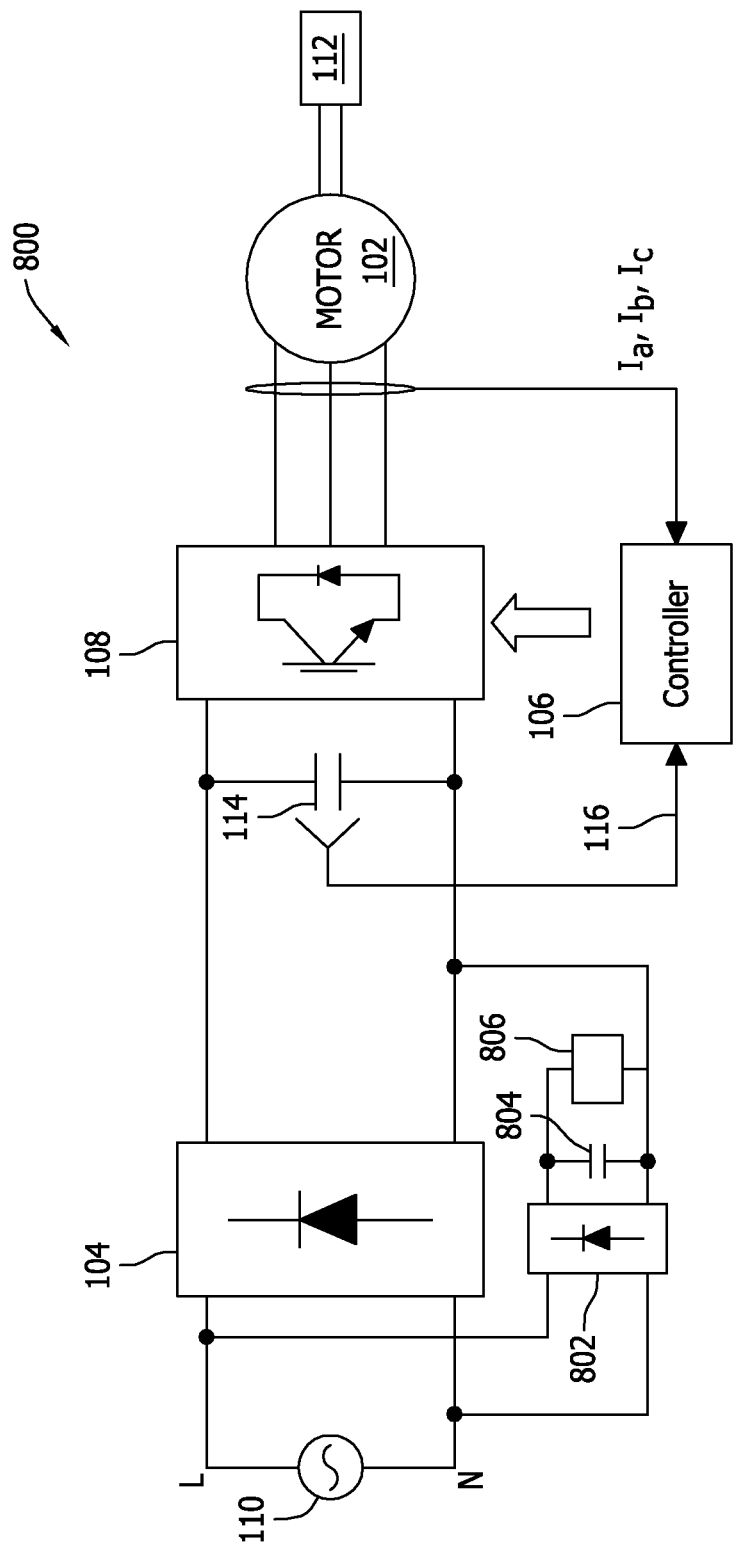
FIG. 8 is a functional diagram of an exemplary embodiment of a motor controller.

FIG. 8 is a functional diagram of an exemplary embodiment of a motor controller 800. Components of motor controller 800 that are identical to components of motor controller 100 (shown in FIG. 1) are described using the same reference characters as in FIG. 1.

In the exemplary embodiment, motor controller 800 includes rectifier 104, controller 106, and inverter 108. Motor controller 800 is coupled to power supply 110 for receiving input power to drive electric motor 102. Electric motor 102 is coupled to and drives a load 112. Controller 106 implements the algorithm described in FIG. 2.

In the exemplary embodiment, power supply 110 supplies a single-phase AC voltage to motor controller 800. However, power supply 110 may supply three-phase AC, DC voltage, or any other type of input voltage that enables motor controller 800 to function as described herein. Rectifier 104 receives an AC input voltage from power supply 110 and rectifies it to produce a pulsed DC voltage. Inverter 108 conditions the pulsed DC voltage, and supplies it to electric motor 102, which uses the power to drive load 112. In the exemplary embodiment, inverter 108 converts the pulsed DC voltage to a three-phase AC voltage. Alternatively, inverter 108 converts the pulsed DC voltage to any type of voltage that enables motor controller to function as described herein.

In the exemplary embodiment, motor controller 800 includes capacitor 114 for storing small amounts of energy when input voltage is available. Capacitor 114 has a capacitance between about 0.1 μF/kW and about 10 μF/kW. The use of bulky, unreliable electrolytic filter capacitors in motor controller 800 is avoided. In some embodiments, capacitor 114 is configured to filter out switching frequency harmonics of electric motor 102. In other embodiments, the low-capacitance of capacitor 114 reduces inrush input current to electric motor 102. Further, capacitor 114 facilitates motor controller 800 increasing line input power factor. Voltage sensor 116 (shown in FIG. 1) may also be provided across capacitor 114 for measuring DC link voltage being output by rectifier 104. Voltage sensor 116 provides the DC link voltage measurement to controller 106 for use in controlling electric motor 102 to produce torque when DC link voltage has a 100% voltage ripple.

In the exemplary embodiment, motor controller 800 also includes a second rectifier 802 coupled in parallel to a capacitor 804. Second rectifier 802 and capacitor 804 are coupled between power supply 110 and rectifier 104. Together, second rectifier 802 and capacitor 804 provide a constant voltage to be delivered to a low-voltage power supply 806. In the exemplary embodiment, low-voltage power supply 806 provides power for electronics of motor controller 800, such as, for example, controller 106.

Figure 9:
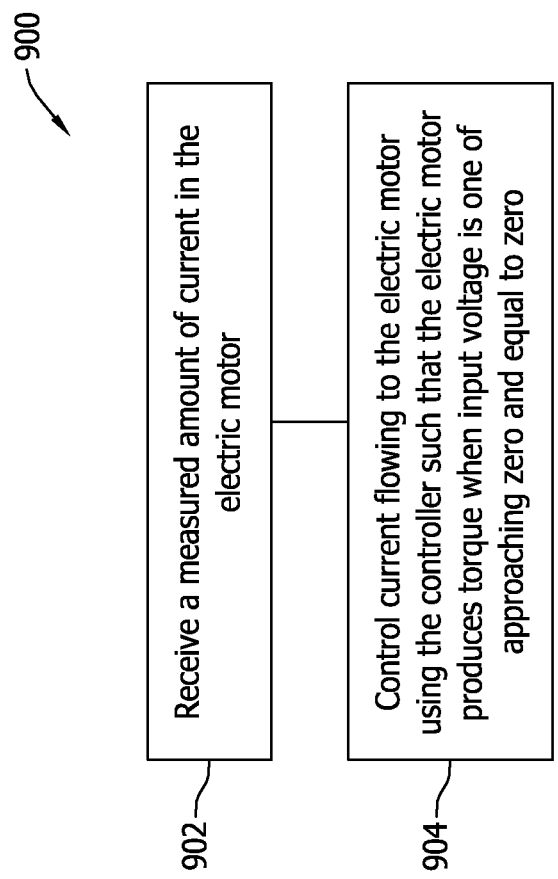
FIG. 9 is a flow chart of an exemplary method of operating an electric motor using the motor controller shown in FIG. 1.

FIG. 9 is a flow chart 900 of a method of operating an electric motor, such as electric motor 102 (shown in FIG. 1) using motor controller 100 (shown in FIG. 1). In the exemplary embodiment, electric motor 102 is coupled to a load 112 (shown in FIG. 1) and to a power supply, such as power supply 110 (shown in FIG. 1).

In the exemplary embodiment, motor controller 100 receives 902 a measured amount of current in electric motor 102. The amount of current is measured by at least one current sensor 200 (shown in FIG. 2) coupled to electric motor 102 and to motor controller 100.

In the exemplary embodiment, motor controller 100 then controls 904 current flowing to electric motor 102 such that electric motor 102 produces positive torque when input voltage is one of approaching zero and equal to zero.

In one embodiment, to control current flowing to electric motor 102, controller 106 induces a flux linkage component $I_d$ of the current to maintain a torque component $I_q$ of the current above zero while reducing loss of energy stored in the stator windings of electric motor 102.

In another embodiment, to control current flowing to electric motor 102, controller 106 is configured to induce the flux linkage component $I_d$ of the current to maintain the torque component $I_q$ of the current above zero while reducing torque ripple in electric motor 102.

In yet another embodiment, to control current flowing to electric motor 102, controller 106 is configured to induce the flux linkage component $I_d$ of the current to maintain the torque component $I_q$ of the current above zero while manipulating torque harmonics to reduce audible noise in electric motor 102.

Figure 10:
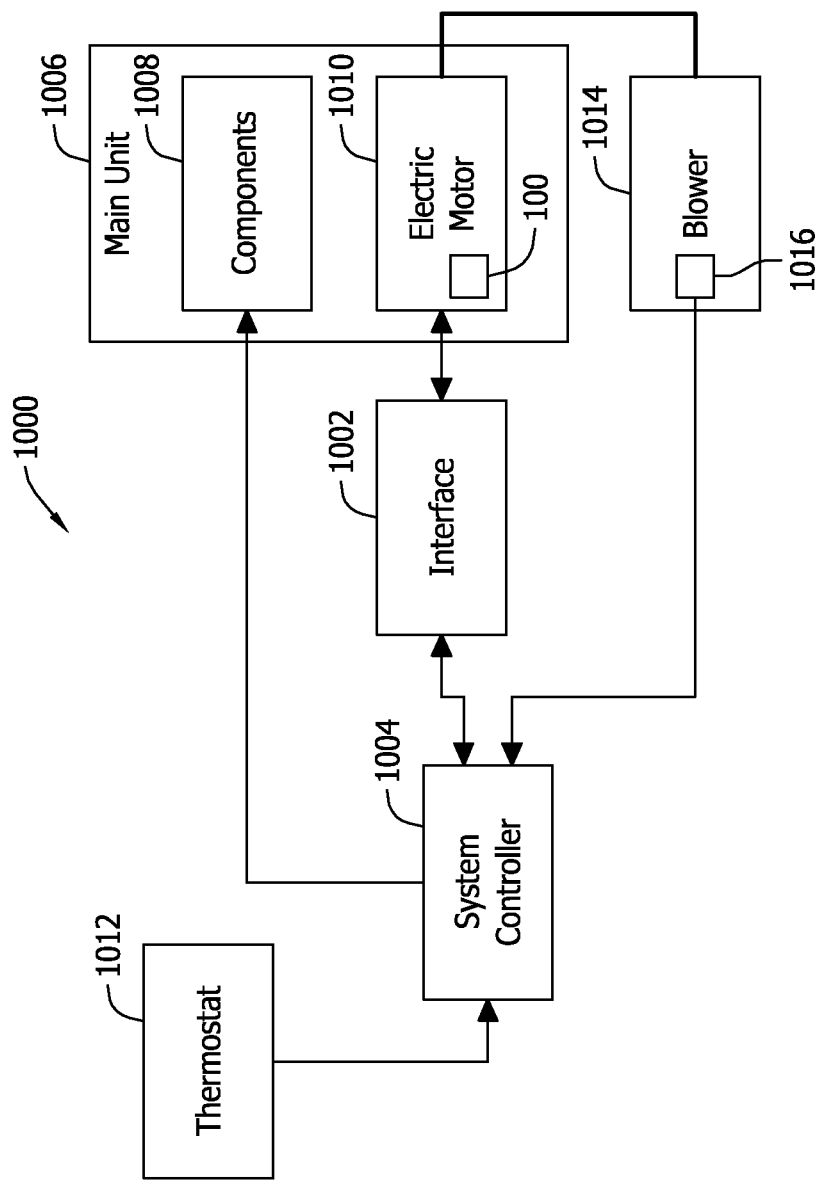
FIG. 10 is a block diagram of an exemplary embodiment of the motor controller shown in FIG. 1 used an air moving control system.

FIG. 10 is a block diagram of an exemplary embodiment of motor controller 100 shown in FIG. 1 in an air moving control system 1000. System 1000 is an air moving system, such as a residential heating, ventilation and air conditioning (HVAC) system, a light industrial HVAC system, or a clean room filtering system. While described herein as being used in an HVAC system, motor controller 100 may be used in other applications, including, but not limited to, swimming pool pumps, laundry machine motors, and gas pre-mix motors. System 1000 includes an interface circuit 1002 electrically coupled to a system controller 1004, for example a HVAC system controller, and a main unit 1006, for example a HVAC unit. Main unit 1006 includes components 1008 and electric motor 1010. In one embodiment, electric motor 1010 is a motor configured to rotate a blower. Electric motor 1010 includes motor controller 100 including a processing unit (shown in FIG. 2) and a memory (not shown) containing an electric motor drive program. In one embodiment, system controller 1004 is connected to a thermostat 1012. Thermostat 1012 includes a plurality of settings, or modes, such as low heat, high heat, cooling, dehumidify, and continuous fan. Additionally, thermostat 1012 measures a temperature in a predetermined space or location and transmits an electrical signal representing the measured temperature to system controller 1004.

System controller 1004 controls main unit 1006 via interface circuit 1002. Interface circuit 1002 receives control signals in the form of input voltage signals from system controller 1004 and translates the signals to signals suitable for controlling by electric motor 1010. Typically, circuits within system 1000 operate at a different voltage level than does electric motor 1010. Therefore interface circuit 1002 is utilized for communications between system controller 1004 and electric motor 1010. Such interfaces typically control electric motors using pulse width modulation (PWM) by continuously adjusting motor speed.

The translated signals are transmitted to motor controller 100 of electric motor 1010, and a torque of electric motor 1010 is varied in accordance with the adjusted voltage outputs. Electric motor 1010 is mechanically connected to a blower 1014. In one embodiment, blower 1014 includes a detection module 1016 which provides signals, for example signals indicative of a speed of rotation of blower 1014, to system controller 1004.

In operation, as motor controller 100 varies the torque of electric motor 1010, controller 106 monitors and manages energy storage on a load 112 (shown in FIG. 1). In the exemplary embodiment, load 112 is blower 1014. The torque applied to electric motor 1010 translates into rotational speed of blower 1014. When input voltage is available, mechanical energy in the form of inertia of blower 1014 is stored. When input voltage becomes low or approaches zero, controller 106 manages energy transfer from blower 1014 back to electric motor 1010.

The described embodiments provide a cost savings to the manufacturer and ultimately to the consumer as electrolytic filter capacitors are eliminated from a motor controller of an electric motor. Additionally, reliability of such systems increases as there are fewer components within the system. Moreover, the described embodiments reduce total harmonic distortion and increase the power factor of the electric motor in which they are installed.

A technical effect of the methods and systems described herein may include one or more of: (a) rectifying an alternating current (AC) input voltage received from the power supply to produce a pulsed direct current (DC) voltage, wherein the DC voltage drops to a value of approximately zero during each half cycle when the AC input voltage transits a value of zero, wherein energy is stored on the load coupled to the electric motor when AC input voltage is available; (b) receiving, by an inverter coupled to an output of the rectifier, the DC voltage to provide a conditioned output voltage to the electric motor; and (c) controlling, by a control unit coupled to the inverter, energy transfer between the electric motor and the load such that the electric motor generates positive torque when the DC voltage supplied to the inverter is one of approaching zero and equal to zero.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric motor controller configured to be coupled to an electric motor, said motor controller comprising:
   a rectifier configured to rectify a nominal alternating current (AC) input voltage from a power supply to produce a pulsed direct current (DC) voltage that drops to a value of approximately zero during each cycle of the AC input voltage when the AC input voltage transits a value of zero;
   an inverter coupled to an output of said rectifier, said inverter configured to receive the pulsed DC voltage that drops to the value of approximately zero during each cycle and to provide a conditioned output voltage to the electric motor;
   a DC link defined between said rectifier and said inverter, wherein said DC link includes a capacitor having a capacitance between 0.1 mircofarad (µF) and 10 µF; and
   a control unit coupled to said inverter and configured to:
      receive a measurement of current being provided to the electric motor;
      receive a measurement of voltage output by said rectifier;

determine, based on the measured voltage output by said rectifier, whether the AC input voltage is increasing or decreasing relative to the value of zero; and when the AC input voltage is decreasing towards the value of zero, inject a negative value of a flux linkage component of current into control signals transmitted to said inverter to maintain a corresponding torque component of the current at a positive value such that the electric motor continues to generate torque as the nominal AC input voltage transits the value of zero and no input voltage is momentarily provided to the electric motor.

2. The motor controller in accordance with claim 1, wherein said control unit is further configured to maintain torque of the electric motor above a predefined torque threshold when the AC input voltage transits a value of zero.

3. The motor controller in accordance with claim 1, wherein said control unit is further configured to increase a rotational speed of the electric motor when input voltage is available, wherein the increased rotational speed generates energy that is stored on the load as inertia.

4. The motor controller in accordance with claim 3, wherein the inertia limits speed variations of the electric motor to enable continuing torque production when input voltage is unavailable.

5. The motor controller in accordance with claim 1, wherein said control unit is further configured to maintain positive torque of the electric motor when the AC input voltage transits a value of zero by using energy stored in the motor windings.

6. The motor controller in accordance with claim 1, wherein to control current to the electric motor, said control unit is configured to induce a flux linkage component of current to maintain a torque component of the current above zero.

7. The motor controller in accordance with claim 6, wherein said control unit is further configured to induce the flux linkage component of current while reducing stator winding losses in the electric motor.

8. The motor controller in accordance with claim 6, wherein said control unit is further configured to induce the flux linkage component of current while reducing torque ripple in the electric motor.

9. The motor controller in accordance with claim 6, wherein said control unit is further configured to induce the flux linkage component of current while manipulating torque harmonics to reduce audible noise in the electric motor.

10. The motor controller in accordance with claim 1, further comprising a DC link positioned between said rectifier and said inverter.

11. The motor controller in accordance with claim 10, further comprising a voltage clamping device coupled across said DC link, said voltage clamping device configured to protect said controller against an over-voltage condition.

12. The motor controller in accordance with claim 1, further comprising a capacitor coupled across said DC link, said capacitor configured to mitigate switching frequency harmonics.

13. A method of controlling an electric motor using a motor controller, the electric motor configured to be coupled to a power supply and to a load, said method comprising:

rectifying, by a rectifier, a nominal alternating current (AC) input voltage received from the power supply to produce a pulsed direct current (DC) voltage, wherein the DC voltage drops to a value of approximately zero during each half cycle of the AC input voltage when the AC input voltage transits a value of zero;

receiving, by an inverter coupled to an output of the rectifier, the DC voltage that drops to the value of approximately zero during each cycle to provide a conditioned output voltage to operate the electric motor;

receiving, by a control unit coupled to the inverter, a measurement of current provided to the electric motor;

receiving, by the control unit, a measurement of voltage output by the rectifier at a DC link defined between the rectifier and the inverter, wherein the DC link includes a capacitor having a capacitance between 0.1 mircofarad ($\mu F$) and 10 $\mu F$;

determining, by the control unit, whether the AC input voltage is increasing or decreasing relative to the value of zero; and when the AC input voltage is decreasing towards the value of zero, injecting, by the control unit, a negative value of a flux linkage component of current into control signals transmitted to the inverter to maintain a corresponding torque component of the current at a positive value such that the electric motor continues to generate torque as the nominal AC input voltage transits the value of zero and no input voltage is momentarily provided to the electric motor.

14. The method in accordance with claim 13, further comprising:

increasing, by the control unit, a rotational speed of the electric motor when input voltage is available; and storing energy generated by the increased rotational speed on the load as inertia.

15. The method in accordance with claim 13, wherein controlling the energy transfer comprises controlling current flowing to the electric motor to produce positive torque when input voltage is one of approaching zero and equal to zero.

16. A system comprising:
an electric motor; and
a motor controller coupled to said electric motor, said motor controller comprising:
a rectifier configured to rectify a nominal alternating current (AC) input voltage from a power supply to produce a pulsed direct current (DC) voltage that drops to a value of approximately zero during each cycle of the AC input voltage when the AC input voltage transits a value of zero;
an inverter coupled to an output of said rectifier, said inverter configured to receive the pulsed DC voltage and to provide a conditioned output voltage to said electric motor;
a DC link defined between said rectifier and said inverter, wherein said DC link includes a capacitor having a capacitance between 0.1 mircofarad ($\mu F$) and 10 $\mu F$; and
a control unit coupled to said inverter, said control unit configured to:
receive a measurement of current being provided to said electric motor;
receive a measurement of voltage output by said rectifier;
determine, based on the measured voltage output by said rectifier, whether the AC input voltage is increasing or decreasing relative to the value of zero; and
when the AC input voltage is decreasing towards the value of zero, inject a negative value of a flux linkage component of current into control signals transmitted to said inverter to maintain a corresponding torque component of the current at a positive value such that the electric motor continues to generate torque as the nominal AC input voltage transits the value of zero on the reference x-axis and no input voltage is momentarily provided to the electric motor.

17. The system in accordance with claim 16, wherein said control unit is further configured to increase a rotational speed of said electric motor when input voltage is available, wherein the increased rotational speed generates energy that is stored on the load as inertia.

\* \* \* \* \*